US012799040B2

(12) United States Patent
Mirvalad et al.

(10) Patent No.: US 12,799,040 B2
(45) Date of Patent: Nov. 17, 2026

(54) SIMULTANEOUS CONDITIONING AND CURING PROCESS FOR CONCRETE PRODUCTS

(71) Applicant: CARBICRETE INC., Montreal (CA)

(72) Inventors: Javad Mirvalad, Montreal (CA); Mehrdad Mahoutian, Montreal (CA); Chris Stern, Westmount (CA)

(73) Assignee: CARBICRETE INC., Montreal (CA)

( * ) Notice: Subject to any disclaimer, the term of this patent is extended or adjusted under 35 U.S.C. 154(b) by 16 days.

(21) Appl. No.: 17/973,598

(22) Filed: Oct. 26, 2022

(65) Prior Publication Data

US 2023/0127527 A1 Apr. 27, 2023

Related U.S. Application Data

(60) Provisional application No. 63/271,801, filed on Oct. 26, 2021.

(51) Int. Cl.
*C04B 40/02* (2006.01)
*B28B 11/24* (2006.01)

(52) U.S. Cl.
CPC ...... *C04B 40/0254* (2013.01); *C04B 40/0231* (2013.01); *B28B 11/24* (2013.01); *B28B 11/245* (2013.01); *B28B 11/247* (2013.01)

(58) Field of Classification Search
CPC . C04B 40/02; C04B 40/0231; C04B 40/0245; C04B 40/0254; C04B 40/0277;
(Continued)

(56) References Cited

U.S. PATENT DOCUMENTS

| | | | | |
|---|---|---|---|---|
| 100,167 | A | 2/1870 | Mackay | |
| 2,496,895 | A * | 2/1950 | Staley | B28B 11/246 106/702 |

(Continued)

FOREIGN PATENT DOCUMENTS

| | | | |
|---|---|---|---|
| CA | 2904720 | A1 | 10/2014 |
| CA | 2937822 | A1 | 7/2015 |

(Continued)

OTHER PUBLICATIONS

Machine English translation of Liu et al. (CN 112551957 A) (Year: 2021).*

(Continued)

*Primary Examiner* — Jeffrey M Wollschlager
*Assistant Examiner* — EdgaredManuel Troche
(74) *Attorney, Agent, or Firm* — CANTOR COLBURN LLP

(57) ABSTRACT

A method of manufacturing a concrete product, includes: providing a composition including a binder, an aggregate, and water; mixing the binder, the aggregate, and the water to produce a concrete mixture; imparting a form to the concrete mixture to provide a formed intermediate having a first water-to-binder ratio; and concurrently conditioning and curing the formed intermediate by conditioning the formed intermediate while curing the formed intermediate, wherein the formed intermediate is concurrently cured and conditioned to obtain final water-to-binder ratio less than the first water-to-binder ratio.

19 Claims, 4 Drawing Sheets

(58) Field of Classification Search
CPC .... C04B 41/5307; C04B 40/024–0268; C04B 40/0281; C04B 40/0295; C04B 28/04; C04B 5/00; C04B 7/14; C04B 40/0263; C04B 35/6269; B28B 11/243; B28B 11/245; B28B 11/247; B28B 1/54; B28B 11/24; Y10S 264/43
USPC ...................... 264/82, DIG. 43, 133; 106/702
See application file for complete search history.

(56) References Cited

U.S. PATENT DOCUMENTS

| | | | | | |
|---|---|---|---|---|---|
| 3,393,261 | A | * | 7/1968 | Munz | B28B 15/00 106/731 |
| 4,233,008 | A | * | 11/1980 | Murray | B29C 35/0277 425/77 |
| 4,772,439 | A | | 9/1988 | Trevino-Gonzalez | |
| 5,257,464 | A | | 11/1993 | Trevino-Gonzalez | |
| 9,221,027 | B2 | | 12/2015 | Kuppler | |
| 10,016,739 | B2 | | 7/2018 | Kuppler | |
| 10,338,053 | B2 | | 7/2019 | Atakan | |
| 10,351,478 | B2 | | 7/2019 | Quinn | |
| 10,668,443 | B2 | | 6/2020 | Kuppler | |
| 2018/0093240 | A1 | * | 4/2018 | Kuppler | C04B 40/0231 |
| 2018/0194693 | A1 | * | 7/2018 | Quinn | B28B 11/243 |
| 2018/0230056 | A1 | * | 8/2018 | Chiaverini | C04B 24/04 |
| 2019/0047175 | A1 | * | 2/2019 | Hargest | C04B 40/0236 |
| 2019/0194074 | A1 | * | 6/2019 | Amr | C04B 28/188 |
| 2022/0332655 | A1 | * | 10/2022 | Keulen | C04B 28/18 |
| 2023/0286865 | A1 | * | 9/2023 | Lawrence | B32B 9/06 442/33 |

FOREIGN PATENT DOCUMENTS

| | | | | | |
|---|---|---|---|---|---|
| CA | 2957400 | A1 | | 2/2016 | |
| CA | 3024307 | A1 | | 12/2017 | |
| CA | 3038515 | A1 | | 3/2018 | |
| CN | 105801069 | A | * | 7/2016 | |
| CN | 112551957 | A | * | 3/2021 | C04B 28/005 |
| WO | 2009078430 | A1 | | 6/2009 | |
| WO | WO-2014160168 | A1 | * | 10/2014 | B01J 10/005 |
| WO | WO-2018058139 | A1 | * | 3/2018 | B28B 11/245 |
| WO | 2021028581 | A1 | | 2/2021 | |

OTHER PUBLICATIONS

Parron-Rubio et al., "Slag Substitution as a Cementing Material in Concrete: Mechanical, Physical and Environmental Properties," (Sep. 2019); NPL1; Retrieved from https://www.ncbi.nlm.nih.gov/pmc/articles/PMC6765977/ (Year: 2019).*
International Search Report for corresponding application PCT/CA2022/051580 filed Oct. 26, 2022; Mail date Jan. 12, 2023.
Written Opinion for corresponding application PCT/CA2022/051580 filed Oct. 26, 2022; Mail date Jan. 12, 2023.
Hilal El-Hassan, Thesis, "Static and Dynamic Carbonation of Lightweight Concrete Masonry Units", McGill University Libraries, Department of Civil Engineering and Applied Mechanics McGill University, Montreal, Dec. 2012.
Third Party Submission re U.S. Appl. No. 17/973,598, filed Oct. 25, 2023.

* cited by examiner

SIMULTANEOUS CONDITIONING AND CURING PROCESS FOR CONCRETE PRODUCTS

CROSS-REFERENCE TO RELATED APPLICATIONS

This application claims priority to U.S. Patent Application No. 63/271,801 filed Oct. 26, 2021, the entire contents of which are incorporated herein by reference.

TECHNICAL FIELD

This disclosure relates generally to concrete products and, more particularly, to systems and methods used for manufacturing such concrete products.

BACKGROUND

In manufacturing concrete products, a dry mixture, which may include a cement and aggregate, is mixed with water. The resultant intermediate undergoes a conditioning step in which some of the water it contains is evaporated. The conditioned intermediate product subsequently undergoes a separate curing step, in order to obtain the final concrete product. The conditioning step is time-consuming and may be quite sensitive. Poor performance and/or quality of the finished product can result if this conditioning step is not executed properly. Hence, improvements are sought.

SUMMARY

There is accordingly provided a method of manufacturing a concrete product, comprising: providing a composition including a binder, an aggregate, and water; mixing the binder, the aggregate, and the water to produce a concrete mixture; casting the concrete mixture in a mould to provide a moulded intermediate; demoulding the moulded intermediate to provide a demoulded intermediate; and concurrently conditioning and curing the demoulded intermediate.

The present disclosure proposes a method to cure and dry a concrete product simultaneously inside an enclosed environment. The simultaneous carbonation and conditioning process may occur at reduced relative humidity (RH) conditions. The carbonated concrete product is optionally reinforced. Ground steel slag, Portland cement, pozzolanic materials, hydraulic and non hydraulic cements can be used as binder in the production of concrete.

The method in accordance with the present disclosure may allow concrete manufacturers to quickly produce concrete products with any suitable water content. The water content of the concrete mix may be determined by the concrete manufacturer, and may depend on the type of concrete, ambient temperature/RH, and molding conditions used. Later, the fresh concrete products may be simultaneously conditioned and cured with carbon dioxide no matter what the initial water/moisture/humidity content is.

As a result of the method of the present disclosure, concrete products may be cured with carbon dioxide under any ambient conditions, e.g. temperature and RH, and with any concrete mix proportion. Initial water content may not affect the performance of the cured concrete. In contrast with the existing technology, the initial water content of the mix is not required to get reduced to a lower water content before the carbonation reaction starts. The above-mentioned process eliminates the risk of poor conditioning and consequently, the production of poor-quality concrete products.

In the current disclosure, fresh concrete products are subjected to water extraction/conditioning and $CO_2$ curing at the same time as opposed to sequentially. Once fresh concrete products are formed, they may be immediately placed inside a curing chamber. The curing chamber may be capable of reducing the relative humidity and activating concrete with $CO_2$, simultaneously. The reduction of relative humidity inside the chamber may be done in various ways and by different means. With the current disclosure, the optimum water-to-binder ratio for the carbonation reaction may be achieved while the products are under $CO_2$ pressure. The optimum water-to-binder ratio is the level of water content in the fresh product that provides suitable conditions for precipitation of calcium carbonate once the product is under CO2 curing. If the water content is above or below the optimum level, proper precipitation may not be satisfactory. The optimum water-to-binder ratio may range from between 5% and 100% of initial water-to-binder ratio.

In one aspect, there is provided a method of manufacturing a concrete product, comprising: providing a composition including a binder, an aggregate, and water; mixing the binder, the aggregate, and the water to produce a concrete mixture; imparting a form to the concrete mixture to provide a formed intermediate having a first water-to-binder ratio; and concurrently conditioning and curing the formed intermediate by conditioning the formed intermediate while curing the formed intermediate, wherein the formed intermediate is concurrently cured and conditioned to obtain final water-to-binder ratio less than the first water-to-binder ratio.

The method defined above and described herein may also include one or more of the features, in whole or in part, and in any combination.

In some embodiments, the method includes conducting the conditioning and the curing in an enclosure sealed from an environment outside the enclosure.

In some embodiments, the method includes injecting carbon dioxide in the enclosure at a concentration of at least 5% by volume and at a pressure of at least 0.1 PSI.

In some embodiments, the concurrently conditioning and curing of the formed intermediate includes absorbing water evaporated from the formed intermediate during the concurrently conditioning and curing.

In some embodiments, the absorbing of the water includes absorbing the water with one or more of a desiccant material contained within the enclosure and a dehumidifier.

In some embodiments, the concurrently conditioning and curing includes concurrently conditioning and curing the formed intermediate free of additional external sources of heat and/or pressure.

In some embodiments, the concurrently conditioning and curing includes varying a rate at which the formed intermediate is conditioned during the concurrently conditioning and curing.

In some embodiments, the varying of the rate includes varying the rate with one or more of exposing the formed intermediate to an airflow having a varying speed, exposing the formed intermediate to a temperature variation, and exposing the formed intermediate to a relative humidity variation.

In some embodiments, the imparting of the form to the concrete mixture includes casting the concrete mixture in a mould to provide a moulded intermediate.

In some embodiments, the method includes demoulding the moulded intermediate to provide a demolded intermediate, the concurrently conditioning and curing of the formed intermediate includes concurrently conditioning and curing the demolded intermediate.

In some embodiments, the concurrently conditioning and curing of the formed intermediate includes concurrently conditioning and curing the formed intermediate while the formed intermediate is inside the mould.

In some embodiments, the method includes pre-conditioning the formed intermediate to obtain a pre-conditioned intermediate before the concurrently conditioning and curing the formed intermediate.

In some embodiments, the pre-conditioning of the formed intermediate includes pre-conditioning the formed intermediate until the formed intermediate has a pre-conditioned water-to-binder ratio less than the first water-to-binder ratio and greater than the final water-to-binder ratio.

In some embodiments, the pre-conditioning of the formed intermediate includes exposing the formed intermediate to one or more of an air flow and heat.

In some embodiments, the method includes stabilizing the formed intermediate before the concurrently conditioning and curing the formed intermediate.

In some embodiments, the stabilizing of the formed intermediate includes exposing the formed intermediate to stationary ambient air until the difference between the water-to-binder ratio on the surface and in the core of the formed intermediate is decreased by at least 5%.

In some embodiments, the method includes performing an initial carbon dioxide saturation of the formed intermediate before the concurrently conditioning and curing the formed intermediate.

In some embodiments, the performing of the initial carbon dioxide saturation includes exposing the formed intermediate to carbon dioxide until a rate of mass gain of the formed intermediate as a result of the absorbed carbon dioxide is reduced by at least 90%.

In another aspect, there is provided a method of manufacturing a concrete product, comprising: providing a composition including a binder, an aggregate, and water; mixing the binder, the aggregate, and the water to produce a concrete mixture; imparting a form to the concrete mixture to provide a formed intermediate having a first water-to-binder ratio; and while curing the formed intermediate, decreasing a water content of the formed intermediate from the first water-to-binder ratio to a final water-to-binder ratio.

In yet another aspect, there is provided a method of manufacturing a concrete product, comprising: providing a composition including a binder, an aggregate, and water; mixing the binder, the aggregate, and the water to produce a concrete mixture; imparting a form to the concrete mixture to provide a formed intermediate having a first water-to-binder ratio; and conducting a curing process of the formed intermediate, the curing process being initiated at a first time and completed at a second time, and conditioning the formed intermediate between the first time and the second time.

Many further features and combinations thereof concerning the present improvements will appear to those skilled in the art following a reading of the instant disclosure.

DETAILED DESCRIPTION

Introduction

Commercially, precast concrete products are cured with heat and steam. In the past few years, new technologies based on mineralization have emerged allowing curing of concrete products with carbon dioxide. These technologies employ a process in which fresh concrete products are conditioned first before they get exposed to carbon dioxide. There is a need to find new ways of conditioning concrete.

Traditionally, Portland cement has been used as the binder in concrete production where curing is done using heat and steam. In contrast, the present method includes simultaneously conditioning and carbonation curing of concrete. This process may use carbon dioxide to cure precast concrete products and the binder is not limited to Portland cement. The proposed method for production of concrete products, that are optionally reinforced, may lead to equal or superior mechanical and durability properties when compared to concrete products cured using traditional methods. The proposed process may also reduce the emission of greenhouse gases into the atmosphere. Finally, the use of the proposed method for the production of precast concrete products, optionally reinforced, may increase the rate of production at precast concrete-making facilities.

The carbonation reaction between calcium-rich materials and carbon dioxide occurs once calcium leached from the material and CO2 are dissolved in water. In a concrete sample, the reaction happens at a specified pore saturation. Once the pores are filled with water and the saturation rate is 100%, there is little to no reaction between slag and carbon dioxide. This observation is also valid when there is no water in the pore, or where the pore saturation is zero percent. The optimum pore saturation, or in simpler terms, the moisture content of the mix, results in the highest carbonation reaction rate. The pore saturation is the ratio between volume of water and volume of pore for each pore. The optimum pore saturation is achieved when the conditions for precipitation of calcium carbonate are ideal in that pore under CO2 curing. The optimum pore saturation depends on many factors and may range from 0.05 to 0.95. Preferably, the pore saturation ranges from 0.3 and 0.7. Diverging from the optimum moisture content may lead to a lower carbonation reaction and lower concrete performance.

Figure 1:
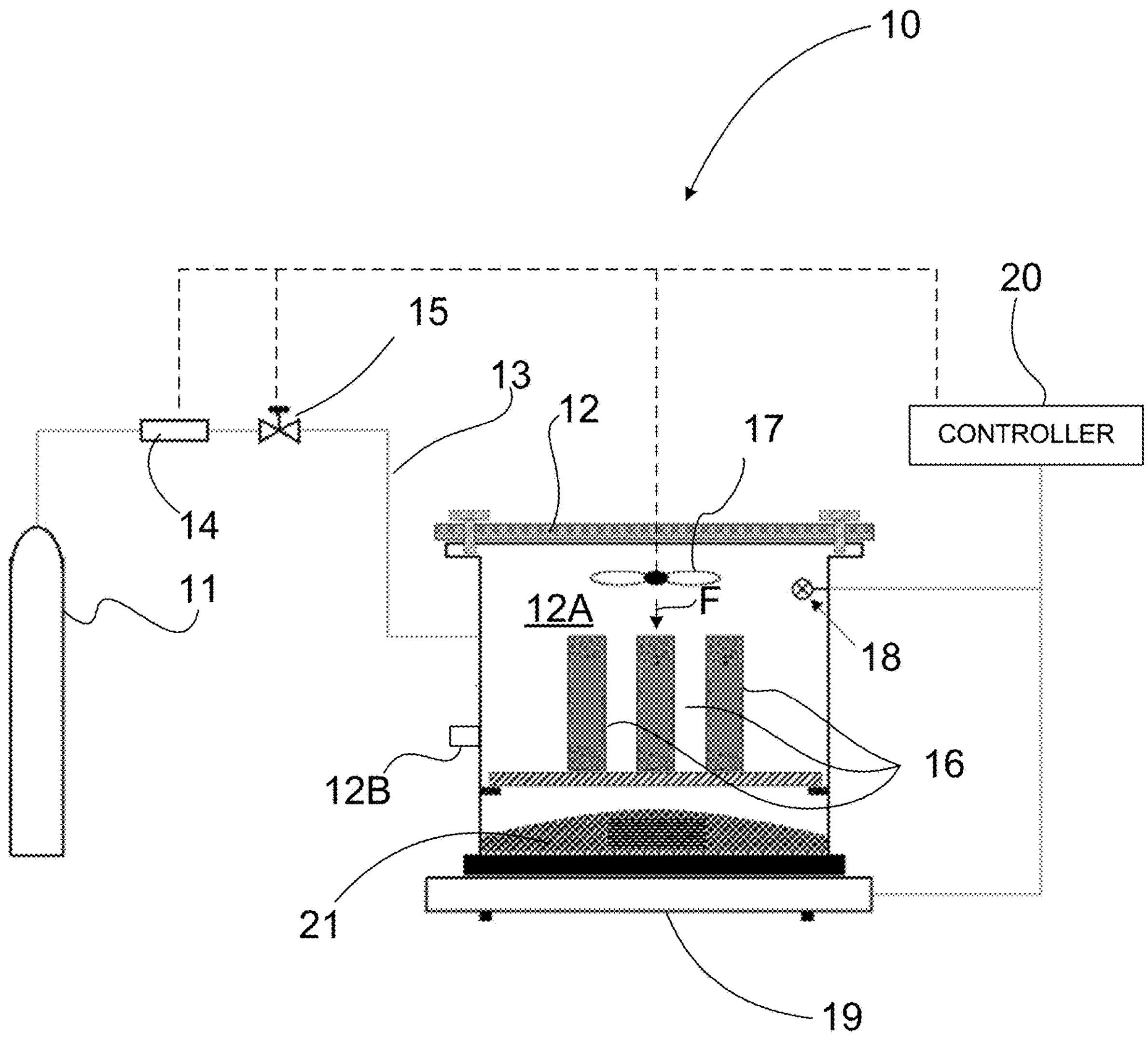
FIG. 1 is a schematic view of a system used for curing and conditioning a concrete product.

Referring now to FIG. 1, an exemplary system for conditioning and curing a concrete product is shown at 10. The system 10 includes a source of carbon dioxide 11, which may be a reservoir or tank, pneumatically connected to an enclosure 12 via a line 13. In the embodiment shown, the system 10 includes a heater 14 for heating the carbon dioxide as it flows from the source of carbon dioxide 11 to the enclosure 12. In the present configuration, the system 10 includes a valve 15 that may be selectively open or closed to allow or restrict the flow of carbon dioxide toward the enclosure 12.

The enclosure 12 defines an inner space or chamber 12A that is sized to accept the plurality of concrete products 16 to be cured. In the embodiment shown, the enclosure 12 includes top bottom and side walls interconnected to one another in an airtight manner. In the context of the present disclosure, "airtight" implies that there is little to no leakage of gas through the enclosure 12 at a pressure differential the enclosure 12 is subjected to. The pressure differential corresponds to a difference between the pressure inside the enclosure 12 and an ambient pressure outside the enclosure 12. The enclosure 12 may be structurally designed to withstand a pressure differential created by a greater pressure of the carbon dioxide inside the enclosure 12 than an atmospheric pressure outside the enclosure 12. A blower 17 may be located in the chamber 12A of the enclosure 12 and is operable to generate an airflow F that may accelerate the conditioning and/or curing process.

In some embodiments, the enclosure 12 may be used to cure the concrete products 16 using a low-pressure curing. In the context of the present disclosure, the expression "low-pressure" implies pressures that exceed the ambient pressure by at most 10% of the ambient pressure. More detail about low-pressure curing are presented in U.S. patent application Ser. No. 17/581,320 filed Jan. 21, 2022, the entire content of which is incorporated herein by reference. The enclosure 12 may be a deployable structure (e.g. bag).

The system 10 may further include one or more sensors 18, which may include one or more of a temperature sensor and a humidity sensor. The temperature sensor and humidity sensor 18 are operatively connected to the chamber 12A and are operable generate one or more signals indicative of a temperature and a humidity level inside the enclosure 12. A scale or balance 19 may support the enclosure 12 and is used to measure a weight variation of the concrete products 16 during the conditioning and curing phase. The balance 19 may send a signal indicative of a weight of the enclosure 12 containing the concrete products 16. More specifically, water content of the concrete products 16 is expected to evaporate during the conditioning and curing phase. The balance 19 may measures this weight variation and may be used to determine whether the conditioning and curing process is completed.

In the embodiment shown, the system 10 includes a controller 20 that may be operatively connected to the temperature and humidity sensor 18, to the balance 19, to the heater 14, to the blower 17, and to the valve 15. The controller 20 may therefore independently control the injection of carbon dioxide through the valve 15 and the actuation of the blower 17. In the embodiment shown, the controller 20 includes a computing device 400 such as the one shown and described below with reference to FIG. 4. The controller 20 may act as a data logger to save temperatures, weights, pressures, etc. data points during the conditioning and curing process. The controller 20 is operable to receive data from the temperature and humidity sensor 18 and from the balance 19; and to control operating parameters of the heater 14, the valve 15, and the blower 17. These operating parameters may include, for instance, a temperature of the heater 14, whether the valve 15 should be opened, closed, or at an intermediate position to control a flow of carbon dioxide through the valve 15, a rotational speed of the blower 17, and so on.

In the present embodiment, and as will be explained further below, the conditioning phase occurs while concrete products 16 are located inside the enclosure 12. During the conditioning phase, it is expected that water would be released from the concrete product 16. Since the enclosure 12 is closed to an environment outside the enclosure 12, it is desirable to absorb the extracted humidity from the concrete product. In the present case, a desiccant material 21 is located inside the enclosure 12 and is used to absorb excess humidity. In an alternate embodiment, the air within the enclosure may be heated to reduce its relative humidity and increase its moisture retaining capability. A combination of the desiccant material and the heating of the air may be used. A desiccant material may be a hygroscopic material that is used to induce or sustain a state of dryness in its vicinity. These desiccant materials may absorb water. The desiccant material may, in one particular example, include silica gel. Desiccant materials may be in forms other than solid, and may work through other principles, such as chemical bonding of water molecules. Desiccant materials may include, in any combinations, activated charcoal, calcium sulfate, calcium chloride, zeolites, and so on. The desiccants materials may be adsorbent materials as opposed to absorbent material. An absorbent material would contain the water by allowing the water to penetrate through it. An absorbent material may be porous and the water may be absorbed by penetrating porosities of the absorbent material. An adsorbent material will stick to water molecules. In other words, the water will be detained by the adsorbent material by being adhered to a surface of the adsorbent material. The adsorbent material may attract moistures and hold it like a magnet on its surface. It will be understood that any means able to extract humidity from the enclosure 12 during the simultaneous curing and conditioning may be used. For instance, a de-humidifier, an air conditioning, and any other suitable means may be used.

Method

Figure 2:
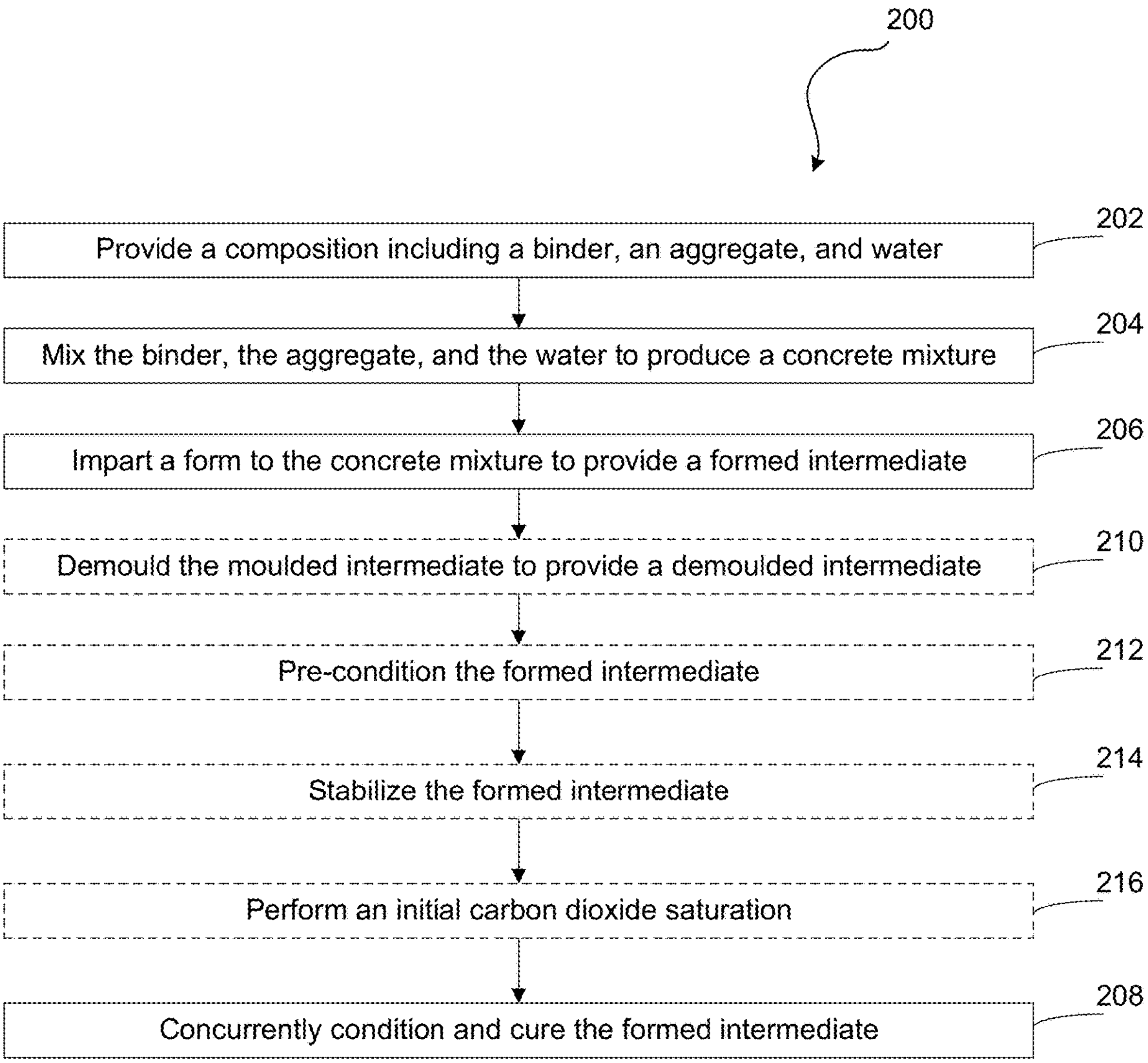
FIG. 2 is a flowchart illustrating steps of a method of manufacturing a concrete product.

Referring now to FIG. 2, a method of manufacturing a concrete product is shown at 200. The method 200 includes providing a composition including a binder, an aggregate, and water at 202; mixing the binder, the aggregate, and the water to produce a concrete mixture at 204; imparting a form to the concrete mixture to provide a formed intermediate having a first water-to-binder ratio at 206; and concurrently conditioning and curing the demoulded intermediate at 208. In the present embodiment, the first water-to-binder ratio may range from 0.05 to 0.95. In some embodiments, the first water-to-binder ratio ranges from 0.05 to 0.7, preferably from 0.1 to 0.6, and more preferably from 0.15 to 0.5.

Mixture & Forming

Herein, the imparting of the form to the concrete mixture at 206 includes casting the concrete mixture in a mould to provide a moulded intermediate. The method 200 of the present embodiment includes a step of demoulding the moulded intermediate to provide a demolded intermediate at 210. The concurrent conditioning and curing at 208 may include concurrently conditioning and curing the demolded intermediate. In some embodiments, the concurrently conditioning and curing of the formed intermediate at 208 includes concurrently conditioning and curing the formed intermediate while the formed intermediate is still inside the mould.

Various types of aggregate including natural or artificial normal weight and lightweight aggregates can be incorporated into the dry or wet concrete product as filler in the production of concrete product. Examples of potential lightweight aggregates includes natural lightweight aggregate (e.g. pumice), expanded clay aggregate, expanded shale aggregate and expanded iron slag aggregate. Other usable aggregates include: crushed stone, manufactured sand, gravel, sand, recycled aggregate, granite, limestone, quartz, chalk powder, marble powder, quartz sand and artificial aggregate. These aggregates are incorporated into the mix as fine and/or coarse aggregates. Aggregate content can be as high as 90% of the weight concrete composition.

In some embodiments, the imparting of the form to the concrete mixture at 206 includes transferring the freshly prepared concrete mixture by any appropriate means and cast in a prepared mould. The mould may be made of steel, iron, aluminum, plastic, FRP or another material. The mould may be pre-lubricated prior to casting in order to facilitate the demoulding process. If using a wet mix, it may be consolidated within the mould by internal or external vibrators. In some cases, the consolidation step lasts no more than 120 seconds. Dry cast concrete may be compacted/pressed/pressurized/formed into the mould by compaction and or vibration.

In some embodiments, the providing of the composition includes providing the composition including one or more chemical admixture and/or one or more mineral. The chemical admixture may include one or more of a water reducers that may improve workability of the concrete mixture, an air entrainer that may improve freeze and thaw resistance, a water repellent, a retarder, and an accelerator. In addition to these commercially available admixtures, there may be few chemicals that may improve certain performance parameters of the disclosed concrete product.

The mixing of the binder, the aggregate, and the water to produce the concrete mixture at 204 may include producing a wet mixture having a mixture water-to-binder ratio. The mixing of the binder, the aggregate, and the water to produce the concrete mixture at 204 may include producing a dry mixture having a different mixture water-to-binder ratio.

In some embodiments, the providing of the composition at 202 includes providing a composition being free of a slag. The providing of the composition at 202 may include providing the composition including the binder including one or more of fly ash, calcinated shale, silica fume, zeolite, ground granulated blast furnace slag, limestone powder, hydraulic cements, and non-hydraulic cements.

In some embodiments, the providing of the composition at 202 includes providing the composition with the binder including slag, the slag including one or more of a steel slag, a stainless steel slag, a basic oxygen converter sludge, a blast furnace sludge, a by-product of zinc production, a by-product of iron production, and a by-product of copper production. The steel slag may include one or more of reduced steel slag, oxidized steel slag, converter steel slag, electrical arc furnace slag, basic oxygen furnace slag, ladle slag, fast-cooled steel slag, and slow-cooled steel slag.

The providing of the composition at 202 may comprise providing the composition with one or more of an accelerator, a retarder, a viscosity modifying agent, an air entertainer, a foaming agent, an alkali silica reaction inhibitor, an anti-wash-out, a corrosion inhibitor, a shrinkage reducer, a concrete crack reducer, a plasticizer, a super plasticizer, a sealer, a paint, a coating, a water reducer, a water repellant, an efflorescence controller, a polymer powder, a polymer latex, and a workability retainer. The providing of the composition at 202 may comprise providing the composition with one or more of cellulose fibers, glass fibers, micro synthetic fibers, natural fibers, polypropylene fibers, polyvinyl alcohol fibers, and steel fibers.

In some embodiments, the method 200 includes inserting a reinforcing material inside the mould before the casting of the concrete mixture. The inserting of the reinforcing material may include inserting bars made of the reinforcing material, the reinforcing material including one or more of carbon steel, stainless steel, and fiber reinforced polymer.

The casting of the concrete mixture at 206 may include casting the concrete mixture in a shape of a precast, a concrete pipe, a box culvert, a draining product, a paving slab, a floor slab, a traffic barrier, a wall manhole, a retaining wall, a paver, a tile, or a shingle.

The binder material which is intended to be used may be reactive towards carbon dioxide. However, the binder may have some level of hydraulic properties. In other words, the binder may be reactive towards water. The hydraulic properties may include, for instance, the material's reactivity towards water to form chemical components leading to hardening of concrete and providing structural strength to the matrix. The hydraulic properties include any tendency for the binders to react chemically or interact physically with water as a result of which the final chemical or physical products contribute to the strength development of concrete. According to the American Concrete Institute (ACT), hydraulic cement is "a binding material that sets and hardens by chemical reaction with water and is capable of doing so underwater. For example, portland cement and slag cement are hydraulic cements."

Concurrent Conditioning & Curing

The concurrent conditioning and curing of the formed intermediate at 208 comprises removing moisture from the formed intermediate while curing the formed intermediate, wherein the formed intermediate is concurrently cured and conditioned to obtain final water-to-binder ratio less than the first water-to-binder ratio. In other words, while the formed intermediate is being cured, a water content of the formed intermediate decreases from the first water-to-binder ratio to a final water-to-binder ratio. Stated differently, the step 208 comprises conducting a curing process of the formed intermediate, the curing process being initiated at a first time and completed at a second time, and conditioning the formed intermediate between the first time and the second time.

In the embodiment shown, the moisture extraction that is happening using the concurrent conditioning and curing at 208 is additional to a moisture extraction that inherently occurs when the mixture is exposed to ambient air. In other words, any concrete mixture is expected to loose a portion of its water content due to evaporation to the surrounding environment. During the concurrent conditioning and curing step at 208, the moisture that is removed is greater than a moisture extraction that would inherently happen if the concrete mixture were left exposed to ambient air.

In the present embodiment, to remove more moisture, the concurrent conditioning and curing step at 208 includes actively removing moisture. Actively removing the moisture from the mixture may improve properties of the concrete product compared to a configuration in which the curing occurs after water has been extracted from the mixture during conditioning. The actively removing of the moisture may include, for instance, one or more of exposing the formed intermediate to an airflow and exposing the formed intermediate to heat, exposing the formed intermediate to a heated airflow. Any means used to increase a moisture extraction from the formed intermediate are contemplated.

Generally, the required moisture extraction may vary depending on many factors including product type, shape, mix design, and slag type. In the embodiment shown, the concurrent conditioning and curing of the formed intermediate at 208 includes reducing a water-to-binder ratio of the formed intermediate by at least 10%. For example, if a water-to-binder ratio is 0.2 immediately before the concurrent conditioning and curing at 208, the water-to-binder ratio may be reduced to 0.18 during the concurrent conditioning and curing at 208. Other values are contemplated.

Herein, the expression "concurrent" denotes that two processes occur at the same time, simultaneously. In other words, while the formed intermediate is being cured, some water is being evaporated out of it as part of the conditioning process. Typically, the water-to-binder ratio is constant during the curing process because the water that is not required for the concrete composition has been removed during the conditioning process which is performed before the curing process. In the present method 200, the curing of the formed intermediate occurs while, at the same time, excess water is being evaporated out of the formed intermediate.

In the embodiment shown, the step of concurrently conditioning and curing the formed intermediate at 208 includes inserting the formed intermediate in the enclosure 12 sealed from an environment outside the enclosure 12. Then, carbon dioxide at a concentration being at least 5% by volume is injected in the enclosure 12. A pressure of the injected carbon dioxide may be at least 0.1 PSI. Any gas containing carbon dioxide, such as flue gas, may be used. Other concentrations are contemplated. In the present embodiment, the step 208 of concurrently conditioning and curing the formed intermediate includes absorbing water evaporated from the formed intermediate during the concurrent conditioning and curing at 208. The absorbing of the water evaporated from the formed intermediate may include absorbing the water with a desiccant material contained within the enclosure 12. In some embodiments, a dehumidifier may be used to extract humidity from the enclosure 12. The desiccant materials may include, for instance, silica gel, clay, calcium oxide, calcium chloride, molecular sieve, activated charcoal, and so on. The concurrent conditioning and curing at 208 may be performed free of additional external sources of heat and/or free of pressure (e.g., mechanical pressure).

In the embodiment shown, the moisture content and/or water content of the concrete mixture may be reduced from high moisture content to the optimum moisture content, and may even go below the optimum moisture content required for the carbonation reaction. The presence of carbon dioxide inside the chamber/enclosed environment/vessel 12 during the concurrent conditioning and curing process at 208 may result in a calcium carbonate precipitation that may improve strength development in concrete products. In other words, the accelerated carbonation curing occurs while the relative humidity of the chamber 12A of the enclosure 12 is kept low. Any precast concrete products, including but not limited to concrete masonry units, paving stones, retaining walls, slabs, traffic barriers, pipes, culverts, etc., can be produced with the proposed process.

In the current disclosure, the pore saturation may be reduced during concurrent conditioning and carbonation curing at 208. The fresh concrete products are dried or semi-dried with the help of reduced relative humidity. Low RH can be obtained by the presence of absorbent materials and/or elevated temperature combined with air flow (e.g., with the blower 17) inside the chamber for better efficiency. In some embodiments, the air flow speed generated by the blower 17 or other suitable means may be at least 0.1 m/s. The absorbent or desiccant materials may be silica gel, clay, calcium oxide, calcium chloride, molecular sieve, activated charcoal, any other industrial absorbents or a combination of any of these. The presence of the absorbent in an enclosed environment with air flow generated by the fan or blower 17 or by other means may gradually reduce the moisture content of the fresh concrete. The circulated air can be cold or hot. The RH inside the chamber 12A may also be lowered using any mechanical equipment including dehumidifiers that use heating and ventilation or condensation methods for extracting water from the air.

Air circulation rate can vary during the concurrent conditioning and curing at 208. In some cases, the blower 17 may be non-operational (e.g., no air flow). This implies that the carbon dioxide inside the enclosure 12 is stationary. This may be done with the controller 20 varying a rotational speed of the blower 17. The amount of absorbent materials 21 required may depend on the type of material used, the total water content in the concrete products, the type of concrete products and the required or target specifications sought. The fresh air can be introduced into the chamber 12A from outside the chamber, or in another embodiment from inside the closed chamber. In other words, a port 12B (FIG. 1) may be provided to insert air through one of the walls of the enclosure 12. The simultaneous conditioning and CO2 curing process at 208 may further continue to reduce the moisture content of concrete products even after the carbonation reaction stops. The absorbent materials 21 may be used for several cycles. The absorbent materials may be replaced by new materials after they lose their capacity for capturing moisture from the air. The absorbent materials can be placed in any position inside the chamber, or can be distributed uniformly inside the chamber.

In another embodiment, the concurrent conditioning and curing step at 208 may be executed by introducing and circulating high-temperature air. If the hot and dry air is introduced into the chamber, the utilization of absorbent materials will be optional. In this case, the high-temperature air may have a higher capacity for humidity and may absorb some moisture from concrete product. In some embodiments, this may be sufficient for getting the product to the optimum water-to-binder ratio, and removing the excess humidity from the chamber may not be required.

In another example, the air inside the chamber may be heated by elements, heaters and other known means. If the air inside the chamber is heated up, the utilization of absorbent materials may be optional. In another embodiment, the body of the chamber may be heated by external heating blanket and other known means in prior art. If the body of the chamber is heated up while the CO2 curing process is underway, the utilization of absorbent materials will be optional. A combination of one or two of the above conditioning methods can be implemented.

The demoulded fresh concrete may be contacted with carbon dioxide, CO2 or a gas containing CO2 while its moisture content is reduced during the simultaneous water extraction and CO2 curing process. The carbon dioxide gas introduced to cure the concrete is at 5%, preferably 10%, preferably 20%, preferably 30%, preferably 40%, preferably 50%, preferably 60%, preferably 70%, preferably 80%, preferably 90%, or preferably 99.5% purity. The gauge pressure of the gas will gradually increase to a range of 0.1 psi and optionally to 100 psi.

The concrete products may be kept under conditioning and CO2 pressure for a given time limit, which may be at least 10 minutes, though the simultaneous conditioning and CO2 curing process at 208 may continue for up to 48 hours.

The concurrently conditioning and curing of the formed intermediate at 208 may include concurrently conditioning and curing the formed intermediate free of additional external sources of heat and/or pressure.

In some embodiments, the drying rate can be varied in the presence of carbon dioxide during the concurrent conditioning and curing at step 208. Drying variation may be provided by different means such as airflow having a varying speed, temperature variation, or relative humidity variation (by one or more of a desiccant material and mechanical means).

The step of concurrent conditioning and curing at 208 may be achieved without additional external source of heat. In some embodiments, the step of concurrent conditioning and curing at 208 may be achieved with additional external source of heat.

In the embodiment shown, extracting moisture from the formed concrete while curing may improve performance of the concrete product, facilitate the production of the concrete product, and improve the quality control process during the manufacturing of the concrete product. The improvement in the performance may happen while moisture extracting is in progress. Herein, the "performance" may be considered to have improved if one or more of these characteristics improved: compressive strength and porosity.

During the concurrent conditioning and curing at 208, one or parameters may be monitored. In some embodiments, one or more of the pressure and the temperature of the gas containing carbon dioxide within the enclosure 12, the relative humidity in the enclosure 12, and/or a volume of moisture absorbed by the desiccant material, may be measured, detected and/or monitored. Regarding the later, it is possible for example to compare the volume absorbed by the desiccant material to the actual moisture content of the fresh concrete product.

It may be determined whether enough water has been extracted after the step at 208. To do so, the concrete units may be cut where the degree of carbonation (i.e. carbon content at different depth) across the thickness suggests if enough water is extracted. For instance, if enough water is not extracted from the core, the core shows a low carbon content/uptake.

Pre-Conditioning

In some embodiments, the method 200 includes pre-conditioning the formed intermediate to obtain a pre-conditioned intermediate at 212 before the concurrently conditioning and curing the formed intermediate at 208. The pre-conditioning of the formed intermediate at 212 may include pre-conditioning the formed intermediate until the formed intermediate has a pre-conditioned water-to-binder ratio that is less than the first water-to-binder ratio. The pre-conditioning of the formed intermediate at 212 may include exposing the formed intermediate to one or more of an air flow and heat. This may be done using the heater 14 and/or the blower 17. In some embodiments, the pre-conditioning at 212 includes pre-conditioning the formed intermediate until its water-to-binder ratio is lowered by at least 10%, optionally at least 20%, or more optionally at least 30%. The pre-conditioning can be done until the water-to-binder ratio is lowered by at least 1%. The weight of the product may be used as an indicator to determine the end of the pre-conditioning step.

This pre-conditioning phase may be carried by keeping the concrete products exposed to ambient air outside the curing chamber 12. This initial partial drying phase 212 may be a resting period before the concurrent curing and drying. In some embodiments, the concrete products may be inserted inside the curing chamber 12A by keeping the curing chamber 12A open to the environment outside thereof to allow some degree of moisture to evaporate to the environment outside the curing chamber 12A.

The concurrently conditioning and curing the formed intermediate at 208 may include inserting the formed intermediate in an enclosure sealed from an environment outside the enclosure. The time required to insert the formed intermediate inside the enclosure may correspond to the pre-conditioning step discussed above.

In the embodiment shown, the pre-conditioning at 212 may correspond to a step of forced drying while no carbon dioxide is injected. During the pre-conditioning at 212, the water-to-binder ratio of the formed intermediate is reduced.

Stabilizing

Once the formed intermediate is placed inside the enclosure 12, it may go through a resting time before the beginning of the CO2 injection into the enclosure 12. The resting time may start right after placing the formed intermediate inside the enclosure or after the pre-conditioning step at 212. The resting time can be called "resting period", "stabilizing period", "initial calcium dissolution/leaching period", or maybe "hydration activation period" to emphasize more on the hydration properties of slag or similar. Air flow/heat may not be required for this resting period. Alternatively, this step can refer to partial drying of the concrete by being merely exposed to the stationary/standing air (no airflow) which has a relative humidity of less than 100% (which provides some capacity for absorbing moisture). In this case, this step can also be called "initial ambient drying", "lowering RH", or similar.

Thus, the method 200 may include stabilizing the formed intermediate at 214 before the concurrent conditioning and curing the formed intermediate at 208. The stabilizing of the formed intermediate at 214 may include exposing the formed intermediate to stationary ambient air until a water-to-slag ratio reaches a stabilized water-to-slag ratio less than the first water-to-binder ratio. More specifically, after the pre-conditioning step at 212, the outer layers of the product have a lower moisture content than the inner layers. This may be explained by the outer layers being directly exposed to ambient air and, thus, moisture may evaporate more easily from these outer layers than from the inner layers. In some cases, moisture gradients above a given threshold may be unsuitable for CO2 curing. The severity of the moisture gradient may be reduced over time if the product is kept for stabilizing. The purpose of the stabilizing step at 214 is to stop the forced drying and provide some time for the moisture in the product to distribute and balance to reach a less significant moisture gradient state. In other words, during the stabilizing step at 214, the forced drying is interrupted and the product is left until the moisture distributes itself more evenly throughout the different layers until the moisture gradient is lowered below a desired threshold. The stabilizing step at 214 may end when the difference between moisture content of the surface and core (e.g., between the outer and inner layers) is reduced by at least 5%. The stabilized water-to-binder ratio after the stabilizing step at 214 should ideally remain substantially the same as the pre-conditioned water-to-binder ratio after the pre-conditioning step at 212 since no action is taken to remove more moisture from within the product. The same moisture content is present albeit distributed more evenly.

The stabilized water-to-slag ratio may be less than the pre-conditioned water-to-binder ratio. The exposing of the formed intermediate to the stationary ambient air may be done by leaving the formed intermediate exposed to air of an environment outside the enclosure 12. In another embodiment, the exposing of the formed intermediate to stationary ambient air may be done by leaving the formed intermediate inside the enclosure 12 while the enclosure 12 is still opened and while the blower 17 is powered off. The stabilizing at 214 may be formed without using any heat and/or airflow.

In the embodiment shown, the stabilizing at 214 corresponds to a step free of forced drying while no carbon dioxide is injected. During the stabilizing at 214, the difference between the water-to-binder ratio within the outer layer and the water-to-binder ratio within the inner layer is reduced. In this stabilizing step at 214, the overall water-to-binder ratio of the product may remain substantially constant.

Initial Carbon Dioxide Saturation

In some embodiments, the method 200 may comprise performing an initial carbon dioxide saturation of the formed intermediate at 216 before the concurrent conditioning and curing at 208. The performing of the initial carbon dioxide saturation at 216 may include exposing the formed intermediate to carbon dioxide. The purpose of the initial carbon dioxide saturation step at 208 is to ensure that the carbon dioxide is dissolved and has saturated the pore water and has diffused throughout the product. This may result in improved surface quality. The duration of the saturation step at 216 may be at most 20% of the duration of the concurrent conditioning and curing step at 208. Different techniques may be used to specify the end of the saturation step at 216 including the following two methods. In the embodiment shown, a duration of the saturation step at 216 may be at most 20% of a duration of the concurrent conditioning and curing step at 208.

In one embodiment, the end of the saturation step 216 may be determined when a weight variation of the product as a function of time becomes below a given threshold. More particularly, once the carbon dioxide is injected into the chamber 12A, the weight of the product that is monitored by the scale 19 (FIG. 1) increases and continues increasing until the dissolved carbon dioxide in the pore solution reaches the saturation level throughout the product. At this point, the increase in the weight of the product drops to an insignificant rate. This drop in the rate of weight increase may be used as an indication of the end of the saturation step at 216. In some embodiments, the performing of the initial carbon dioxide saturation at 216 may include exposing the formed intermediate to carbon dioxide until a rate of mass gain of the formed intermediate as a result of the absorbed carbon dioxide is reduced by at least 90%.

In another embodiment, the end of the saturation step 216 may be determined when a pressure variation within the chamber 12A as a function of time becomes below a given threshold. The pressure may be monitored using a pressure sensor operatively connected to the chamber 12A. This pressure sensor may include a pressure gauge, a strain gauge affixed to the enclosure 12, and so on. More particularly, once the carbon dioxide is injected into the chamber 12A, it will start to dissolve in the pore solution of the product. This dissolution results in a drop in pressure that will trigger the system 10 to inject more carbon dioxide to maintain the pressure within the chamber 12A. Once the product's pore solution is saturated with carbon dioxide, the drop in pressure stops and no more carbon dioxide needs to be injected to maintain the pressure. This may be used as an indication of the end of the saturation step at 216. Thus, this drop in the rate of pressure variation may be used as an indication of the end of the saturation step at 216. Similarly, in another embodiment, a mass flow rate of the carbon dioxide may be used: the end of the saturation step at 216 may be determined when the mass flow rate of carbon dioxide required to maintain a desired pressure within the chamber 12A becomes below a given threshold.

During the initial carbon dioxide saturation, once the moulded or demoulded intermediate is placed inside the enclosure 12, carbon dioxide can be injected immediately or after the pre-conditioning of step 212. This initial carbon dioxide saturation may provide some time for the carbon dioxide to dissolve and saturate the accessible pore water and leach more calcium by lowering the PH. The concurrent drying and curing at 208 may start after the initial carbon dioxide saturation at 216. In the regular concurrent drying and curing process, the surface of concrete which is more exposed to the gases inside the enclosure 12 may dry too quickly and provide insufficient time for precipitation of calcium carbonate especially on the outer layers of concrete which can theoretically result in lower overall mechanical properties on outer layers of concrete (i.e., lower strength and abrasion resistance). The initial carbon dioxide saturation may alleviate these drawbacks.

In the embodiment shown, the initial carbon dioxide saturation at 216 corresponds to a step free of forced drying while carbon dioxide is being injected. During the initial carbon dioxide saturation at 216, the carbon dioxide concentration in the pore solution of the formed intermediate increases.

The concurrent conditioning (e.g. water extraction) and curing of the demoulded intermediate product, as described herein, accordingly may permit both processes (that is, the water extraction and the curing) to occur simultaneously. In other words, the conditioning process and the curing process occur in parallel, rather than in series as per previously employed methods. The concurrent condition and curing of the demoulded intermediate product may mean, for example, that a majority of the conditioning or water extraction of the demoulded intermediate occurs as the same time as the demoulded intermediate is cured using the carbonation process as described herein. Substantial time savings may accordingly be achieved using the present process, by avoiding needed to sequentially (i.e. in series—one after the other) condition and then cure the product, as was previously thought to be required. In certain instances, this time savings may be as much as 10-20%.

The proposed method 200 may be adapted to produce a variety of non-reinforced and reinforced concrete products including but not limited to precast, reinforced concrete pipes, box culverts, drainage products, paving slabs, floor slabs, traffic barriers, walls, manholes, precast non-reinforced concrete (plain) pavers, masonry units, retaining walls, tiles and shingles. The products shall satisfy local and national standards and codes.

The present method 200 comprises a step of forced moisture extraction from the product in the presence of carbon dioxide. This step corresponds to the concurrent conditioning and curing at 208. During this step, the product is being cured via the presence of carbon dioxide while moisture is being extracted from the product. The moisture content of the formed intermediate may indicate whether the conditioning has been performed. The moisture content of the formed intermediate significantly decreases during the conditioning.

Figure 3:
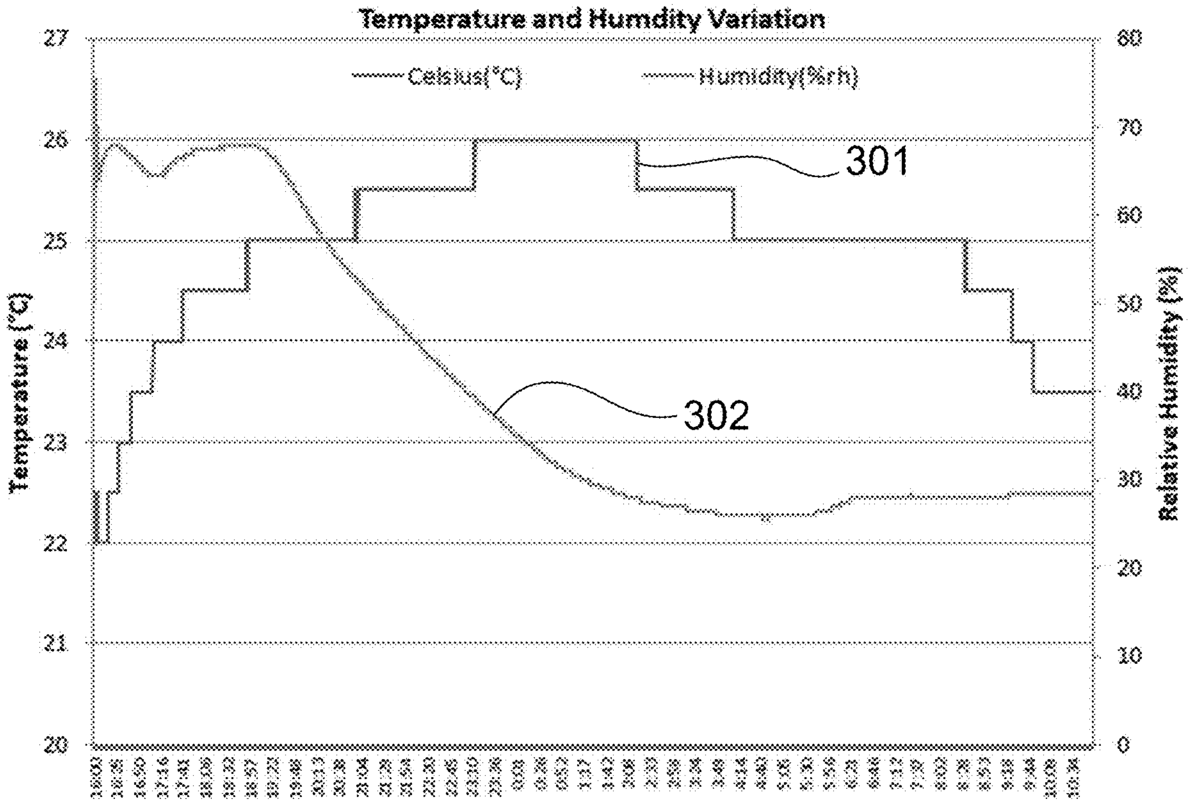
FIG. 3 is a graph illustrating a variation of a temperature and humidity as a function of time during a concurrent and simultaneous conditioning and curing step of the method of FIG. 2.

Referring now to FIG. 3, a graph is provided and illustrates a temperature curve 301 and a relative humidity curve 302 illustrating temperature and relative humidity variations during a 19-hour process of simultaneous conditioning and curing at 210. As one may appreciate, the humidity decreases during the process while the temperature increases up to about the 9th hour. Curing is an exothermic phenomenon. This graph shows that curing may occur while, simultaneously and concurrently, the excess water in the concrete mixture evaporates. This graph shows that it may not be necessary to undergo a dedicated conditioning step to remove excess water prior to curing the concrete mixture. Time savings and efficiency gains may therefore be achieved with the disclosed method 200.

Commercially, precast concrete products are cured with heat and steam. In the past few years, new technologies based on the mineralization have emerged allowing curing of concrete products with carbon dioxide. The existing technologies demonstrate a process in which fresh concrete products are conditioned first before they get exposed to carbon dioxide.

In the current disclosure, the fresh concrete products are subjected to water extraction and CO2 curing at the same time. Once the concrete products are moulded, they are placed inside a curing chamber. The curing chamber is capable of extracting water and activating concrete with CO2, simultaneously. In the current disclosure, the optimum water to slag ratio for the carbonation reaction would achieve while the products are under CO2 pressure.

The proposed method may allow to no longer need to get to the right/optimized water content before starting the carbonation process. Another advantage of this method is that the final products may be more uniform and consistent compared to the products produced with the existing technologies. The ambient humidity and temperature may not affect the performance and quality of products. In contrast with the existing technologies, the fresh concrete may be produced with any water content with no limitation. The proposed method may allow the concrete manufacturers to form the fresh concrete products with no technical restriction and allows them to reduce the turnover for their production.

The carbonation reaction between steel slag and carbon dioxide occurs once calcium leached from slags and CO2 dissolved in water. In a compacted concrete sample, the reaction happens at a specified pore saturation. Once the pores are filled with water and the saturation rate is 100%, the is no or very limited reaction between slag and carbon dioxide. This observation is also valid when there is no water in the pore, or pore saturation of zero percent. The optimum pore saturation, or in a simpler term, the moisture content of the mix, results in a highest carbonation reaction rate. Diverging from the optimum moisture content may lead to a lower carbonation reaction and a lower concrete performance as a result of the lower carbonation reaction. With the current method, the pore saturation may get reduced at the same time of the carbonation curing. The presence of the absorbent in an enclosed environment with air flow generated by a fan may gradually reduce the moisture content of the fresh concrete sample. The moisture content of the mix is reduced from the high moisture content to the optimum moisture content, and it goes below the optimum moisture content. The presence of carbon dioxide inside the chamber/enclosed environment during the water extraction process may result in a calcium carbonate precipitation that may help in strength development in concrete samples.

As a result of this innovation, concrete products may be cured with carbon dioxide at any ambient conditions, e.g. temperature and RH, and with any concrete mix proportion. The initial water concrete would no longer affect the performance of the concrete. In contrast with the existing technology, the initial water content is not required to be brought to the lower water content before the carbonation reaction. This water extraction step is a sensitive step which could result in a poor performance if it is not executed properly. The above mentioned process may eliminate the risk of poor water extraction and production of poor concrete products.

EXAMPLES

It will be appreciated that the scope of the present disclosure is not intended to be limited by the examples below. Moreover, it is understood that the numeric values used in these examples, such as for the different water-to-binder/slag ratios, time of curing, and so on are exemplary only and that one would readily appreciate that concrete may be manufactured by varying those values with the teaching of the current disclosure.

As a reference, concrete samples made with steel slag as the only binder were subjected to a carbon dioxide purity of 95%, while there was no air flow inside the chamber nor absorbing materials. The fresh samples were immediately cured inside the chamber right after demoulding. The samples were not subjected to any water extraction or conditioning. The average compressive strength of the three samples was 1.5 MPa with average CO2 uptake of 0.9% with respect to the mass of binder. The results suggest a very poor carbonation reaction between the concrete and the carbon dioxide.

In another example, concrete samples were made with a combination of aggregates, sands, steel slag and water. The only binder used in this example was ground Electrical Arc Furnace (EAF) steel slag. The water-to-slag ratio of 0.20, by mass, was used. The ratio of slag content to the concrete mass was 30%. In this example, the dry cast concrete was compacted to form a fresh concrete sample. The sample was placed inside the chamber immediately after demoulding. A battery-powered fan circulated air inside the chamber. Silica gel was used in this example to remove the moisture from the air. At the same time, carbon dioxide with a concentration of 99.5% was injected into the sealed curing chamber at a pressure of 6 psi. The overall curing time, i.e. simultaneous conditioning and curing time, was kept at 19 hours. The air density of the samples was recorded at 2289 kg/m3. The compressive strength and carbon uptake were reported as 28.7 MPa and 13.1%, respectively. The reported values are the average of the two results.

In another example, concrete samples, 30×80×80 mm, were made with a combination of aggregates, sands, steel slag and water. The only binder used in this example was ground EAF steel slag. A water-to-slag ratio of 0.22, by mass, was used. The ratio of slag content to concrete mass was kept at 30%. In this example, the dry cast concrete was compacted to form a fresh concrete sample. The sample was placed inside the chamber immediately after demoulding. A combination of air flow and desiccant was used to remove the moisture from the concrete sample while they were exposed to carbon dioxide inside the chamber. The air flow velocity was measured as 2.7 m/s. Silica gel was used in this example to remove the moisture from the air which is an amorphous and porous form of silicon dioxide. The silica gel was in the form of 2-4 mm beads. It had an orange color when it was dry, and its color turned dark green as it absorbed moisture inside the chamber. The silica gel used in this example had an absorption capacity of more than 20% at 50% relative humidity. At the same time, carbon dioxide with the concentration of 99.5% was injected into the sealed curing chamber at a constant pressure of 6 psi. The overall curing time, i.e. simultaneous conditioning and curing time, was kept at 19 hours. In this experiment, the air density of samples was recorded as 2408 kg/m3. The compressive strength and carbon uptake were reported as 31.6 MPa and 12.6%, respectively. The reported values are the average of two results. The silica gel was heated in an oven at 110° C. for two hours until it was re-activated and its orange color was restored for future uses. The re-activated silica gel was re-used for another experiment.

In another example, concrete a sample with the dimension of 80×80×60 mm was made with a combination of aggregates, sands, water and more steel slag. The only binder used in this example was ground EAF steel slag. The water-to-slag ratio of 0.15, by mass, was used. The ratio of slag content to the concrete mass was kept at 50%. In this example, the dry cast concrete was compacted to form a fresh concrete sample. The sample was placed inside the chamber immediately after demoulding. A combination of air flow and desiccant was used to remove the moisture from the concrete sample while they were exposed to carbon dioxide inside the chamber. Silica gel was used in this example to remove the moisture from the air. It was utilized at 25% mass of concrete. At the same time, carbon dioxide with a concentration of 99.5% was injected into the sealed curing chamber at the constant pressure of 6 psi. The overall curing time, i.e. simultaneous conditioning and curing time, was 24 hours. In this experiment, the air density of samples was recorded as 2398 kg/m3. The compressive strength and carbon uptake were reported as 50.3 MPa and 12.1%, respectively.

In another example, concrete samples were made with a combination of aggregates, sands, steel slag and more water. The only binder used in this example was ground EAF steel slag. The water-to-slag ratio of 0.26, by mass, was used. The ratio of slag content to the concrete mass was kept at 30%. In this example, the dry cast concrete was compacted to form fresh concrete sample. The sample was placed inside the chamber immediately after demoulding. A combination of air flow and desiccant was used to remove the moisture from the concrete sample while they were exposed to carbon dioxide inside the chamber. Silica gel was used in this example to remove the moisture from the air. At the same time, carbon dioxide with the concentration of 99.5% was injected into the sealed curing chamber at the constant pressure of 6 psi. The overall curing time, i.e. simultaneous conditioning and curing time, was kept at 19 hours. In this experiment, the air density of samples was recorded as 2404 kg/m3. The compressive strength and carbon uptake were reported as 26.7 MPa and 12.1%, respectively. The reported values are the average of two results.

In another example, concrete samples were made with a combination of aggregates, sands, steel slag and more water. The only binder used in this example was ground ladle slag. The water-to-slag ratio of 0.20, by mass, was used. The ratio of slag content to the concrete mass was kept at 30%. In this example, the dry cast concrete was compacted to form fresh concrete sample. The sample was placed inside the chamber immediately after demoulding. A combination of air flow and desiccant was used to remove the moisture from the concrete sample while they were exposed to carbon dioxide inside the chamber. Silica gel was used in this example to remove the moisture from the air. At the same time, carbon dioxide with the concentration of 99.5% was injected into the sealed curing chamber at the constant pressure of 6 psi. The $CO_2$ concentration inside the chamber was recorded as 20%. The overall curing time, i.e. simultaneous conditioning and curing time, was kept at 19 hours. In this experiment, the air density of samples was recorded as 2441 kg/m3. The compressive strength and carbon uptake were reported as 31.8 MPa and 13.9%, respectively. The reported values are the average of two results.

In another example, concrete samples were made with a combination of aggregates, sands, steel slag and more water. The only binder used in this example was Portland cement, Type 10 in Accordance with CSA-A3000. The water-to-cement ratio of 0.35, by mass, was used. The ratio of cement content to the concrete mass was kept at 20%. In this example, the dry cast concrete was compacted to form fresh concrete sample. The sample was placed inside the chamber immediately after demoulding. A combination of air flow and desiccant was used to remove the moisture from the concrete sample while they were exposed to carbon dioxide inside the chamber. Silica gel was used in this example to remove the moisture from the air. At the same time, carbon dioxide with the concentration of 99.5% was injected into the sealed curing chamber at the constant pressure of 6 psi. The overall curing time, i.e. simultaneous conditioning and curing time, was kept at 19 hours. In this experiment, the air density of samples was recorded as 2273 kg/m3. The compressive strength and carbon uptake were reported as 32.6 MPa and 17.5%, respectively. The reported values are the average of two results.

In another example, concrete samples were made using a combination of aggregates, sands, steel slag and more water. The only binder used in this example was ground hybrid steel slag. The hybrid steel slag was the mix of BOF, EAF and ladle slag. The water-to-slag ratio of 0.20, by mass, was used. The ratio of slag content to the concrete mass was kept at 30%. In this example, the dry cast concrete was compacted to form fresh concrete sample. The sample was placed inside the chamber immediately after demoulding. A combination of air flow and desiccant was used to remove the moisture from the concrete sample while they were exposed to carbon dioxide inside the chamber. Calcium chloride was used in this example to remove the moisture from the air. It was in the form of white pellets and had a purity of 94%. At the same time, carbon dioxide with the concentration of 99.5% was injected into the sealed curing chamber at the constant pressure of 6 psi. The overall curing time, i.e. simultaneous conditioning and curing time, was kept at 19 hours. In this experiment, the air density of samples was recorded as 2380 kg/m3. The compressive strength and carbon uptake were reported as 22.8 MPa and 12.2%, respectively. The reported values are the average of two results. FIG. 3 illustrates the changes in the temperature and humidity of the air inside the chamber during the 19-hour process of simultaneous conditioning and $CO_2$ curing.

In another example, concrete samples were made using a combination of aggregates, sands, steel slag and water. The only binder used in this example was ground EAF steel slag. The water-to-slag ratio of 0.22, by mass, was used. The ratio of slag content to the concrete mass was kept at 30%. In this example, the dry cast concrete was compacted to form fresh concrete sample. The sample was placed inside the chamber immediately after demoulding. A combination of air flow, heater and desiccant was used to remove the moisture from the concrete sample while they were exposed to carbon dioxide inside the chamber. Silica gel was used in this example to remove the moisture from the air. The air inside the chamber was heated up to 35 degrees Celsius by an external source of heating, i.e. a heater, for 3 hours. The temperature and RH values were monitored during the course of the conditioning/carbonation process. At the same time, carbon dioxide with the concentration of 99.5% was injected into the sealed curing chamber at the constant pressure of 6 psi. The overall curing time, i.e. simultaneous conditioning and curing time, was 24 hours. In this experiment, the air density of samples was recorded as 2404 kg/m3. The CO2 uptake was calculated as 12.2%. the moisture content of samples at the end of the conditioning/carbonation process was measured as 1.5%. The moisture content dropped to 1.1% after 5 days while the carbonated concrete samples were resting on a table in ambient conditions, i.e. RH of 50% and temperature of 22 degrees. The moisture content of carbonated samples was further reduced to 1.0% after 10 days of resting at ambient conditions. The reported values are the average of two results.

Figure 4:
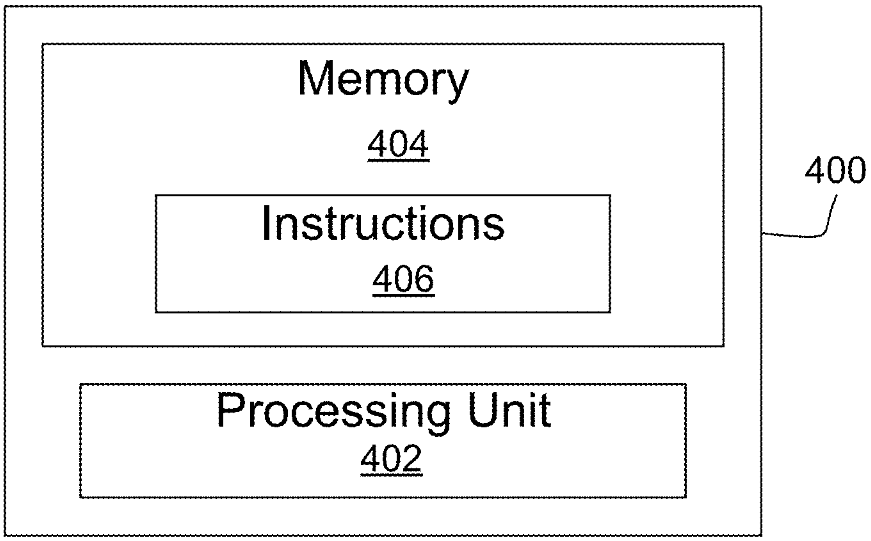
FIG. 4 is a schematic representation of a controller in accordance with one embodiment.

Referring now to FIG. 4, the controller 20 may include a computing device 400, which may comprise a processing unit 402 and a memory 404 which has stored therein computer-executable instructions 406. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for operating the system 10 described herein may be implemented in a high level procedural or object oriented programming or scripting language, or a combination thereof, to communicate with or assist in the operation of a computer system, for example the computing device 400. Alternatively, the methods and systems for operating the system 10 may be implemented in assembly or machine language. The language may be a compiled or interpreted language. Program code for implementing the methods and systems for operating the system 10 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the system 10 may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a concrete product, comprising:

providing a composition including a binder, an aggregate, and water, the binder including slag;

mixing the binder, the aggregate, and the water to produce a concrete mixture;

imparting a form to the concrete mixture to provide a formed intermediate having a first water-to-binder ratio;

placing the formed intermediate inside an enclosure; and after the placing of the formed intermediate inside the enclosure, concurrently conditioning and curing the formed intermediate by conditioning the formed intermediate while curing the formed intermediate inside a chamber defined by the enclosure, including reducing a relative humidity of gases surrounding the formed intermediate inside the chamber below a humidity threshold during the concurrently conditioning and curing, the humidity threshold selected such that the water in the formed intermediate evaporates from the formed intermediate into the enclosure, wherein the formed intermediate is concurrently cured and conditioned to obtain final water-to-binder ratio less than the first water-to-binder ratio.

2. The method of claim 1, wherein the reducing of the relative humidity inside the chamber includes one or more of increasing a temperature of the gases inside the chamber, inducing a forced air flow inside the chamber, and absorbing humidity present in the chamber.

3. The method of claim 2, comprising injecting carbon dioxide in the enclosure at a concentration of at least 5% by volume and at a pressure of at least 0.1 PSI.

4. The method of claim 2, wherein the concurrently conditioning and curing of the formed intermediate includes absorbing water evaporated from the formed intermediate during the concurrently conditioning and curing.

5. The method of claim 4, wherein the absorbing of the water includes absorbing the water with one or more of a desiccant material contained within the enclosure and a dehumidifier.

6. The method of claim 1, wherein the concurrently conditioning and curing includes concurrently conditioning and curing the formed intermediate free of additional external sources of heat and/or pressure.

7. The method of claim 1, wherein the concurrently conditioning and curing includes varying a rate at which the formed intermediate is conditioned during the concurrently conditioning and curing.

8. The method of claim 7, comprising selecting a speed of an airflow to obtain a desired rate at which water is evaporated from the formed intermediate.

9. The method of claim 1, wherein the imparting of the form to the concrete mixture includes casting the concrete mixture in a mould to provide a moulded intermediate.

10. The method of claim 9, comprising demoulding the moulded intermediate to provide a demolded intermediate, the concurrently conditioning and curing of the formed intermediate includes concurrently conditioning and curing the demolded intermediate.

11. The method of claim 9, wherein the concurrently conditioning and curing of the formed intermediate includes concurrently conditioning and curing the formed intermediate while the formed intermediate is inside the mould.

12. The method of claim 1, comprising pre-conditioning the formed intermediate to obtain a pre-conditioned intermediate before the concurrently conditioning and curing the formed intermediate.

13. The method of claim 12, wherein the pre-conditioning of the formed intermediate includes pre-conditioning the formed intermediate until the formed intermediate has a pre-conditioned water-to-binder ratio less than the first water-to-binder ratio and greater than the final water-to-binder ratio.

14. The method of claim 12, wherein the pre-conditioning of the formed intermediate includes exposing the formed intermediate to one or more of an air flow and heat.

15. The method of claim 1, comprising stabilizing the formed intermediate by exposing the formed intermediate to stationary ambient air until the difference between the water-to-binder ratio on the surface and in the core of the formed intermediate is decreased by at least 5% before the placing of the formed intermediate into the enclosure.

16. The method of claim 1, comprising performing an initial carbon dioxide saturation of the formed intermediate before the concurrently conditioning and curing the formed intermediate.

17. The method of claim 16, wherein the performing of the initial carbon dioxide saturation includes exposing the formed intermediate to carbon dioxide until a rate of mass gain of the formed intermediate as a result of the absorbed carbon dioxide is reduced by at least 90%.

18. A method of manufacturing a concrete product, comprising:

providing a composition including a binder, an aggregate, and water, the binder including slag;

mixing the binder, the aggregate, and the water to produce a concrete mixture;

imparting a form to the concrete mixture to provide a formed intermediate having a first water-to-binder ratio;

placing the formed intermediate inside an enclosure;

stabilizing the formed intermediate inside the enclosure before injecting carbon dioxide into the enclosure; and after stabilizing the formed intermediate, while curing the formed intermediate inside a chamber defined by the enclosure, decreasing a water content of the formed intermediate from the first water-to-binder ratio to a final water-to-binder ratio, including reducing a relative humidity of gases surrounding the formed intermediate inside the chamber during the curing of the formed intermediate and the decreasing of the water content of the formed intermediate, including reducing the relative humidity below a humidity threshold selected such that the water in the formed intermediate evaporates from the formed intermediate into the chamber.

19. A method of manufacturing a concrete product, comprising:

providing a composition including a binder, an aggregate, and water, the binder including slag;

mixing the binder, the aggregate, and the water to produce a concrete mixture;

imparting a form to the concrete mixture to provide a formed intermediate having a first water-to-binder ratio;

placing the formed intermediate inside an enclosure;

stabilizing the formed intermediate inside the enclosure before injecting carbon dioxide into the enclosure; and after stabilizing the formed intermediate, conducting a curing process of the formed intermediate inside a chamber defined by the enclosure, the curing process being initiated at a first time and completed at a second time, and conditioning the formed intermediate between the first time and the second time, including reducing a relative humidity of gases surrounding the formed intermediate inside the chamber between the first time and the second time, including reducing the relative humidity below a humidity threshold selected such that the water in the formed intermediate evaporates from the formed intermediate into the chamber.

* * * * *